United States Patent [19]

Jerson et al.

[11] 3,844,834

[45] Oct. 29, 1974

[54] HIGH TEMPERATURE-STABLE ABRASION-RESISTANT COATINGS FOR CONDUCTORS

[75] Inventors: Donald D. Jerson, Mt. Pleasant; Herbert F. Minter, Pittsburgh, both of Pa.

[73] Assignee: Westinghouse Electric Corporation, Pittsburgh, Pa.

[22] Filed: Apr. 17, 1972

[21] Appl. No.: 244,524

[52] U.S. Cl. ................. 117/226, 117/218, 117/232, 174/120 SC, 174/120 AR,

[51] Int. Cl. ............................................. H01b 7/28

[58] Field of Search ........... 117/218, 226, 229, 232, 117/132 A, 132 B, 132 C, 128.4, 128.7, 201; 156/56; 260/86.1; 174/120 C; 120 SC; 120 AR

[56] References Cited

UNITED STATES PATENTS

| | | | |
|---|---|---|---|
| 3,470,045 | 9/1969 | Bronnuall et al. | 156/56 |
| 3,563,916 | 2/1971 | Takashina et al. | 117/226 |
| 3,579,490 | 5/1971 | Kordzinski et al. | 260/86.1 |
| 3,639,163 | 2/1972 | Bishop et al. | 117/128.7 |
| 3,697,467 | 10/1972 | Haughney | 117/229 |

*Primary Examiner*—Charles E. Van Horn
*Assistant Examiner*—J. Massie
*Attorney, Agent, or Firm*—R. D. Fuerle

[57] ABSTRACT

Conductors which are subjected to abrasion at elevated temperatures, such as certain motor or generator windings, are protected against the abrasion by an acrylic rubber coating.

A flowable dispersion in an organic solvent of an acrylic rubber, a curing system for the acrylic rubber, and a filler is prepared and applied to the conductor. The solvent is evaporated and the acrylic rubber is cured to form the protective coating.

12 Claims, 1 Drawing Figure

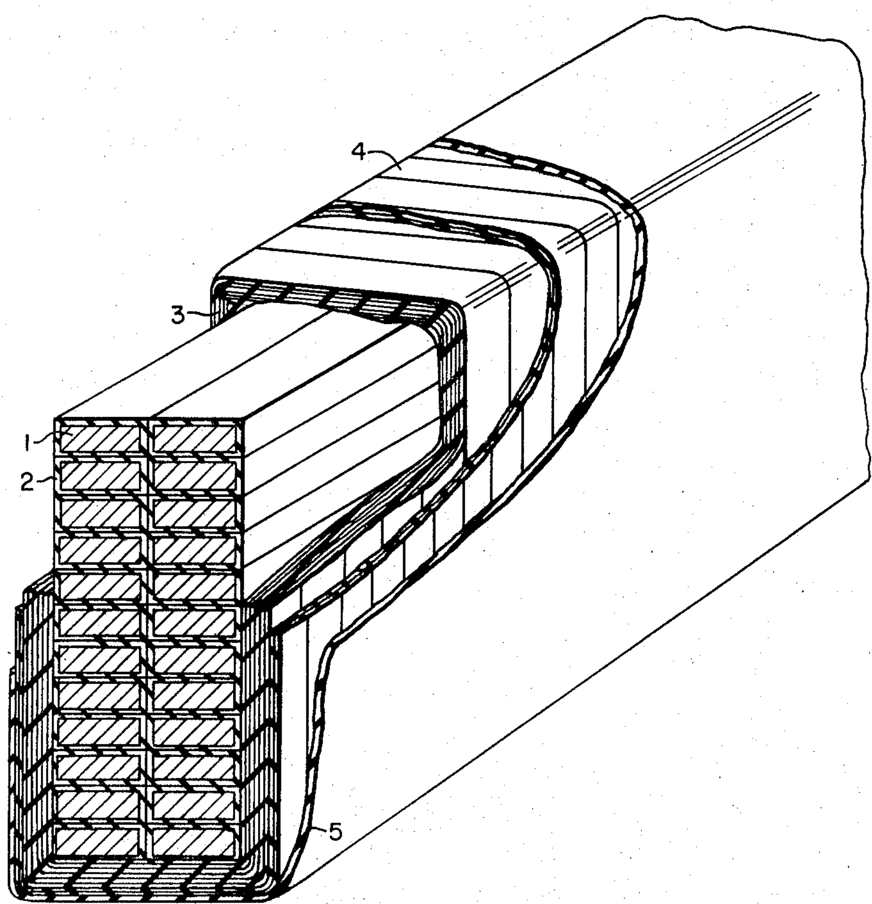
4
3
1
2
5

HIGH TEMPERATURE-STABLE ABRASION-RESISTANT COATINGS FOR CONDUCTORS

BACKGROUND OF THE INVENTION

Large motors and generators produce a great deal of heat and a continuous supply of air is required to keep them at a safe operating temperature (i.e., below about 130°C). This air circulates through and around the ends of the machine where the ground wall insulation is exposed.

The air in and around many industrial operations is filled with an abrasive dust, for example lime dust from cement mills, taconite dust (a hard form of iron oxide) from taconite mines, and fly ash from coalburning power plants. If an unprotected motor or generator is cooled with such air, the abrasive dust in it can strip the insulation from the windings in a few weeks, causing an electrical short circuit. The motor must then be disassembled, the coils rewound, and the motor reassembled, which is a costly operation.

Enclosing the motor and filtering the air supplied to it is too expensive to be widely used since filters are short lived and only marginally effective. In practice, the problem is generally attacked by protecting the insulation with an "elastomeric" coating. Silicone rubber has been favored.

SUMMARY OF THE INVENTION

We have found that conductors coated with an acrylic rubber composition will last considerably longer at a high temperature than conductors coated with silicone rubber or other acceptable types of coatings such as certain kinds of polyurethanes. Acrylic rubber does not have particularly high abrasion resistance at room temperature and therefore it is quite surprising that conductors coated with it display such high abrasion resistance over long periods of time at high temperatures. Polyurethanes start out better, but after a few weeks they deteriorate rapidly and may peel and flake. Silicone rubber vapors attack the commutators and brushes of D.C. motors and generators and therefore require special manufacturing procedures and precautions which acrylic rubber does not. Finally, the acrylic rubber coating is much less expensive than the silicone rubber coating.

DESCRIPTION OF THE INVENTION

The accompanying Drawing is an isometric sectional view of a coated insulated motor winding according to this invention.

In the Drawing, 22 copper bars 1 are each wrapped in insulation 2 and are together wrapped in additional insulation 3 (typically mica), which is held in place by insulating tape 4 after which the composite is impregnated with an insulating resin and cured. A coating 5 of acrylic rubber protects the insulation.

An acrylic rubber composition is prepared from an acrylic rubber, a cure system for the acrylic rubber, and a filler. The acrylic rubber is preferably a soluble copolymer having a molecular weight of at least about 100,000 copolymerized from about 50 to about 95 percent (all percentages herein are by weight) ester of acrylic acid or methacrylic acid and about 5 to about 50 percent of a vinyl comonomer which is co-reactive with the ester and which has only one double bond. The ester is preferably alkyl from $C_1$ to $C_8$; examples include ethyl acrylate, butyl acrylate, methyl methacrylate, hexylmethacrylate, octylacrylate, etc. Ethyl and butyl acrylates are preferred as they are inexpensive and work well. Examples of vinyl comonomers include chlorovinyl ether, which is preferred because it is easy to cure, styrene, acrylonitrile, and methacrylonitrile. Both monomers should be chosen so that the copolymer has a saturated chain backbone and side chains containing at least two carbon atoms. Mixtures of esters and/or mixtures of vinyl comonomers are also contemplated.

The acrylic rubber is a compound which, in its cured state, is a "rubber" according to the definition of ASTM D-1566, i.e., it will forceably retract to less than one and a half times its original length when extended to twice its length and held there for one minute at room temperature. The acrylic rubber should have a glass transition temperature of less than −10°C to assure its effectiveness, for instance, during a startup period when the protected machine may be at a very low temperature.

The cure system used will depend upon the particular acrylic rubber used and this information is generally supplied by the manufacturer of the acrylic rubber. Depending on the rubber, the cure system may range from about 0.2 to about 30 phr (parts per hundred parts of rubber) and it may contain accelerators (e.g., stearic acid, zinc diethyl dithiocarbamate), primary cross-linkers (e.g., polyamines), chlorine acceptors (e.g., zinc oxide), activators (e.g., stearic acid, zinc oxide), heat stabilizers (e.g., dibasic lead phosphite), retarders, etc. A discussion of curing systems for acrylic rubbers may be found under "Vulcanization," page 162, et seq. of The Vanderbilt Rubber Handbook.

The amount of filler used may be about 10 to about 200 phr, but is preferably about 30 to about 150 phr. Below about 30 phr the cost of the composition becomes high and tensile strength and abrasion resistance decrease. Above about 150 phr the composition becomes viscous and consequently difficult to apply, and it tends to lose tensile strength and abrasion resistance. Examples of suitable fillers include talcs, clays, aluminas, silicas (plain, fumed, or hydrated), carbon black, calcium carbonate, and barytes. Mixtures of fillers may also be used. The preferred filler is silica as it is non-conducting and increases abrasion resistance. However, for semi-conducting abrasion resistant coatings, carbon black is preferably included as a filler to provide the conductivity.

The acrylic rubber composition is dispersed in sufficient organic solvent to give a flowable dispersion, the amount and therefore the viscosity depending on the particular method of application to be used, although generally the amount of solvent will range between about 25 to about 1,000 phr. Suitable solvents must be chosen for the rubber to be used and may include ketones, benzene, toluene, xylene, cresol, esters such as amyl acetate and butyl acetate, chlorinated solvents such as trichloroethylene, and mixtures.

The conductor to be coated is cleaned, if necessary, so that it is free of grease and dirt. Generally, the conductor will be insulated but the coating may also be applied to bare metal. The dispersed composition is applied to the conductor by spraying, troweling, brushing, dipping, or other methods. Spraying is preferred for large machines as it is the most convenient method of application. The solvent is then evaporated by heating and the composition is cured, generally at about 120 to about 175°C for about 20 minutes to about 4 hours depending on the particular rubber and cure system used and the thickness of the coating. It is preferable to cure in a stepwise fashion so that the solvent is completely evaporated before the cure has progressed very far. While the coating may be almost any thickness, about 20 to about 100 mils is most practical.

The following example further illustrates this invention.

EXAMPLE

Samples were prepared by wrapping an 18 inch long, 1 inch wide, ½ inch thick copper bar with six and a half turns of a 5 mil thick mica tape and 1 layer butt-lapped of 4-mil thick glass tape. The bars were impregnated twice with an epoxy resin and cured. The bars were then cut in half and dipped into the various solvent-dispersed coating compositions to be tested until a coating about 25 to 30 mils thick was obtained. The solvent was evaporated and the acrylic rubber was cured for several hours at room temperature, one hour at 80°C, and two hours at 135°C. The silicone rubber coating was cured according to the manufacturer's directions.

The testing apparatus consisted of a steel box 22 inches square and 11 inches deep with an exhaust connected to a dust collector. A sample holder inside the box held the sample in place. A strip heater was attached to the back of the sample holder and heated the sample to 130°C. Outside the box, a twelve-inch diameter funnel-shaped hopper was filled with a preweighed amount of fine, dry Berkely sand. When the sample had reached 130°C the sand was permitted to fall 20 inches through a ⅜ inch diameter tube to a sand-air mixing tee, where it was mixed with air at 70 psi and directed through a 10 inch long, ½ inch diameter stainless steel pipe at a portion of the sample exposed by a 2 inch diameter hole in a steel mask. When the coating had been abraded to the bare copper the test was stopped and the remaining sand in the hopper weighed. The sand used per mil of coating thickness braded was calculated. Table I gives the composition of the acrylic rubber samples.

TABLE I (In Pounds)

| | Composition No. | | | |
|---|---|---|---|---|
| | 1 | 2 | 3 | 4 |
| acrylic rubber — a copolymer of chlorovinyl ether and ethyl acrylate, sold by Cyanamid Co. under the trademark "Cyanacryl R" | 500 | 500 | 500 | 500 |
| dibasic lead phosphite, sold by National Lead Co. under the trademark "Dyphos" | 15 | 15 | 15 | 15 |
| hexamethylene diamine carbamate sold by Dupont Co. under the trademark "Diak No. 1" | 5 | 5 | 5 | 5 |
| stearic acid | 5 | 5 | 5 | 5 |
| precipitated hydrated silica, 0.022μm particle size, sold by PPG Industries under the trademark "Hi-Sil 215" | — | 175 | 235 | — |
| carbon black - 300μm particle size | — | — | — | 500 |
| talc, 6 microns particle size, sold by Sierra Talc Co. under the trademark "Mistron Vapor" | 425 | — | — | — |
| TOTAL | 950 | 700 | 760 | 1025 |

The above compositions were dispersed in a mixture of 50 percent methyl isobutyl ketone and 50 percent toluene on a 25 percent solids basis. The silicone rubber used was dispersed in toluene on a 60 percent solids basis.

Table II gives the results of the tests on various samples as initially prepared and after aging for 2 to 32 weeks at 130°C.

TABLE II (Results in lbs. of sand per mil thickness abraded)
Aging Time at 130°C

| Composition | | Initial | 2 weeks | 4 weeks | 8 weeks | 16 weeks | 32 weeks |
|---|---|---|---|---|---|---|---|
| Acrylic Rubber | 1 | 0.77 | 1.18 | 2.05 | 1.45 | 1.19 | |
| | 2 | 4.40 | 3.55 | 3.81 | 2.73 | 1.85 | |
| | 3 | 3.33 | 4.83 | 3.94 | 3.67 | 2.71 | |
| | 4 | 1.85 | 2.57 | 2.02 | 2.53 | 1.95 | 2.35 |
| Silicone Rubber | | 0.93 | 0.99 | 1.06 | 0.95 | 1.13 | 1.14 |

Acrylic rubber composition number 3 maintained a high level of abrasion resistance but the solution stability was not as good as number 4 and number 4 was also less expensive. Therefore, number 4 was considered to be the best example. Table II shows that composition 4 was about twice as resistant to abrasion as silicone rubber.

We claim:

1. An insulated conductor for a motor or generator to be cooled with air containing abrasive particles comprising at least one metal bar covered with electrically non-conductive insulation which is coated with a cured acrylic rubber composition which comprises a filler, a curing system, and a copolymer having a molecular weight of at least about 100,000 polymerized from monomers about 50 to 95 percent selected from the group consisting of esters of acrylic acid, methacrylic acid, and mixtures thereof, and about 5 to 50 percent vinyl monomers co-reactive with said esters and having only one double bond.

2. An insulated conductor according to claim 1 wherein said coating is about 20 to about 100 mils thick.

3. An insulated conductor according to claim 2 wherein said esters are alkyl esters from $C_1$ to $C_8$.

4. An insulated conductor according to claim 3 wherein said esters are selected from the group consisting of ethyl acrylate, butyl acrylate, and mixtures thereof.

5. An insulated conductor according to claim 1 wherein said vinyl monomer is chlorovinyl ether.

6. An insulated conductor according to claim 1 wherein said filler includes silica.

7. An insulated conductor according to claim 1 wherein said filler includes carbon black and said coating is semiconducting.

8. An insulated conductor according to claim 1 wherein said electrically non-conductive insulation is selected from the group consisting of glass, mica, and mixtures thereof impregnated with a cured insulating resin.

9. An insulated conductor according to claim 1 wherein said acrylic rubber composition comprises a. an acrylic rubber which comprises a copolymer having a molecular weight of at least about 100,000 polymerized from monomers which are
   1. about 50 to about 95 percent selected from the group consisting of esters of acrylic acid, methacrylic acid, and mixtures thereof, and
   2. about 5 to about 50 percent vinyl monomers coreactive with said esters and having only one double bond;
b. about 0.2 to about 30 phr of a curing system for said acrylic rubber; and
c. about 10 to about 200 phr of a filler.

10. An insulated conductor according to claim 9 wherein the amount of said filler is about 30 to about 150 phr.

11. An insulated conductor according to claim 1 wherein said acrylic rubber composition has a glass transition temperature of less than −10°C.

12. An insulated conductor according to claim 1 wherein said copolymer has a saturated chain backbone and side chains containing at least two carbon atoms.

* * * * *